United States Patent
Christmas et al.

(10) Patent No.: US 10,928,776 B2
(45) Date of Patent: Feb. 23, 2021

(54) 2D/3D HOLOGRAPHIC DISPLAY SYSTEM

(71) Applicant: Two Trees Photonics Limited, Milton Keynes (GB)

(72) Inventors: Jamieson Christmas, Milton Keynes (GB); Dackson Masiyano, Milton Keynes (GB)

(73) Assignee: Two Trees Photonics Limited, Milton Keynes (GB)

( * ) Notice: Subject to any disclaimer, the term of this patent is extended or adjusted under 35 U.S.C. 154(b) by 607 days.

(21) Appl. No.: 15/658,052

(22) Filed: Jul. 24, 2017

(65) Prior Publication Data
US 2017/0364028 A1    Dec. 21, 2017

Related U.S. Application Data

(63) Continuation of application No. 13/810,001, filed as application No. PCT/GB2011/051328 on Jul. 14, 2011, now Pat. No. 9,715,215.

(30) Foreign Application Priority Data

Jul. 14, 2010   (GB) ...................................... 1011829

(51) Int. Cl.
*G03H 1/26* (2006.01)
*G02B 27/01* (2006.01)
(Continued)

(52) U.S. Cl.
CPC ........... *G03H 1/26* (2013.01); *G02B 27/0103* (2013.01); *G02B 30/26* (2020.01); *G03H 1/08* (2013.01);
(Continued)

(58) Field of Classification Search
CPC .. G03H 1/2294; G03H 1/0808; G03H 1/2205; G03H 1/2286; G03H 2210/30;
(Continued)

(56) References Cited

U.S. PATENT DOCUMENTS

| 4,275,454 A | 6/1981 | Klooster, Jr. |
| 7,127,109 B1 | 10/2006 | Kim |

(Continued)

FOREIGN PATENT DOCUMENTS

| GB | 2436676 | 10/2007 |
| GB | 2438026 | 11/2007 |

(Continued)

OTHER PUBLICATIONS

International Application Serial No. PCT/GB2011/051328, International Preliminary Report on Patentability dated Jan. 24, 2013, 10 pages.

(Continued)

*Primary Examiner* — William R Alexander
*Assistant Examiner* — Sharrief I Broome
(74) *Attorney, Agent, or Firm* — McDonnell Boehnen Hulbert & Berghoff LLP (57) ABSTRACT

The disclosure provides a display system and a method for displaying a virtual image to a viewer An optical system of the disclosure includes a spatial light modulator, a light source, a Fourier transform lens, a viewing system and a processing system. The spatial light modulator is arranged to display holographic data in the Fourier domain, illuminated by the light source. The Fourier transform lens is arranged to produce a 2D holographic reconstruction in the spatial domain corresponding to the holographic data. The viewing system is arranged to produce a virtual image of the 2D holographic reconstruction. The processing system is arranged to combine the Fourier domain data representative of a 2D image with Fourier domain data representative of a phase only lens to produce first holographic data, and provide the first holographic data to the optical system to produce a virtual image.

27 Claims, 5 Drawing Sheets

(51) Int. Cl.
  *G03H 1/08* (2006.01)
  *G03H 1/22* (2006.01)
  *G02B 30/26* (2020.01)
(52) U.S. Cl.
  CPC ......... *G03H 1/0891* (2013.01); *G03H 1/2205* (2013.01); *G03H 1/2249* (2013.01); *G03H 1/2294* (2013.01); *G02B 2027/0127* (2013.01); *G03H 1/0808* (2013.01); *G03H 2001/085* (2013.01); *G03H 2001/2255* (2013.01); *G03H 2001/2297* (2013.01); *G03H 2210/20* (2013.01); *G03H 2210/30* (2013.01); *G03H 2210/33* (2013.01); *G03H 2210/454* (2013.01); *G03H 2225/22* (2013.01); *G03H 2225/32* (2013.01); *G03H 2225/52* (2013.01)
(58) Field of Classification Search
  CPC ................... G03H 1/0005; G03H 1/08; G03H 2001/2242; G03H 2001/0224; G03H 2001/221; G03H 2001/2239; G03H 1/0841; G03H 2225/60; G03H 2001/2271; G03H 1/0443; G03H 1/0866; G03H 2001/0816; G03H 2001/085; G03H 2223/19; G03H 2226/02; G02B 5/32; G02B 27/0093; G02B 26/0833; G02B 27/0103; G02B 21/0032; G02B 26/06; G02B 30/27; G02B 30/50; G02B 2027/0118; G02B 2027/013; G02B 2027/014; G02B 2027/0174; G02B 2027/0178; G02B 26/0808; G02B 27/0172; G02B 27/0944; G02B 27/4205; G02B 30/00; G02B 30/25; G02B 6/266; G02F 2203/12; G02F 2203/50; G02F 1/01; G02F 1/13342; G02F 1/29; G02F 1/31; G02F 2203/28; G02F 1/1326; G02F 1/1335; G02F 1/134363; G02F 1/136277; G02F 1/1393; G02F 1/292; G02F 1/3132; G02F 2001/291; G02F 2201/30; G02F 2201/34; G02F 1/0063; G02F 1/0136; G02F 1/09
  See application file for complete search history.

(56) References Cited

U.S. PATENT DOCUMENTS

| | | | |
|---|---|---|---|
| 8,072,488 | B2 | 12/2011 | Cable et al. |
| 8,085,453 | B2 | 12/2011 | Christmas et al. |
| 8,159,733 | B2 | 5/2012 | Christmas et al. |
| 8,654,048 | B2 | 2/2014 | Collings et al. |
| 8,878,759 | B2 | 11/2014 | Crossland et al. |
| 9,715,215 | B2 | 5/2017 | Christmas |
| 2001/0050787 | A1 | 12/2001 | Crossland et al. |
| 2002/0060831 | A1 | 5/2002 | Gerchberg |
| 2004/0027626 | A1 | 2/2004 | Yamauchi et al. |
| 2004/0042161 | A1 | 3/2004 | Cameron et al. |
| 2005/0041271 | A1 | 2/2005 | Tomoyoshi |
| 2005/0134709 | A1 | 6/2005 | Ishii et al. |
| 2005/0157188 | A1 | 7/2005 | Kubo |
| 2007/0024999 | A1 | 2/2007 | Crossland et al. |
| 2008/0068852 | A1 | 3/2008 | Goihl |
| 2008/0106653 | A1 | 5/2008 | Harris |
| 2008/0192312 | A1 | 8/2008 | Hendricks et al. |
| 2008/0198372 | A1 | 8/2008 | Pan |
| 2009/0002787 | A1* | 1/2009 | Cable ............... G03H 1/2294 359/9 |
| 2009/0128875 | A1 | 5/2009 | Christmas et al. |
| 2009/0257104 | A1 | 10/2009 | Cable et al. |
| 2010/0046750 | A1* | 2/2010 | Asfour ............... G03H 1/00 380/54 |
| 2010/0073467 | A1 | 3/2010 | Nam |
| 2010/0165429 | A1 | 7/2010 | Buckley et al. |
| 2011/0002019 | A1 | 1/2011 | Routley et al. |
| 2011/0157667 | A1* | 6/2011 | Lacoste ............... G03H 1/2205 359/9 |
| 2012/0133937 | A1 | 5/2012 | Heintzmann et al. |
| 2013/0022222 | A1 | 1/2013 | Zschau et al. |
| 2013/0265622 | A1 | 10/2013 | Christmas et al. |
| 2014/0253987 | A1 | 9/2014 | Christmas et al. |
| 2015/0009695 | A1 | 1/2015 | Christmas et al. |
| 2015/0022526 | A1 | 1/2015 | Christmas et al. |
| 2015/0346491 | A1 | 12/2015 | Christmas |

FOREIGN PATENT DOCUMENTS

| | | |
|---|---|---|
| GB | 2446852 | 8/2008 |
| GB | 2461294 | 12/2009 |
| GB | 2509180 | 6/2014 |
| JP | H06-027863 | 4/1994 |
| JP | H11-3128 A | 1/1999 |
| JP | H11-003128 | 6/1999 |
| JP | 2003-515180 | 4/2003 |
| JP | 2004-538519 | 12/2004 |
| JP | 2005-181854 | 7/2005 |
| JP | 2006-301020 | 11/2006 |
| JP | 2007-523359 | 8/2007 |
| JP | 2008-544307 | 12/2008 |
| JP | 2009-536748 | 10/2009 |
| JP | 2011-0508911 | 3/2011 |
| JP | 2013-524270 | 6/2013 |
| WO | 01/35155 | 5/2001 |
| WO | 2007/132650 | 11/2001 |
| WO | 03/014837 | 2/2003 |
| WO | 2003/060612 | 7/2003 |
| WO | 2005/059881 | 6/2005 |
| WO | 2006/134404 | 12/2006 |
| WO | 2007/131649 | 11/2007 |
| WO | 2009/087358 | 7/2009 |
| WO | 2009/156752 | 12/2009 |
| WO | 2012007762 | 1/2012 |

OTHER PUBLICATIONS

Miao et al., "Phase Retrieval from the magnitude of the Fourier transforms of non-periodic objects," J. Opt. Soc. Am., vol. 15, No. 6, pp. 1662-1669 (Jun. 1998).

Notification of Reason(s) for Refusal for Appln. No. 2014-537712, dated Mar. 17, 2015 (with English Abstract).

Notification of Reason(s) for Refusal for Appln. No. 2014-537712, dated Sep. 30, 2014 (with English Abstract).

Buckley, et al., "Full Colour Holographic Laser Projector HUD", SID Vehicles and Photons 2008, 15th Annual Symposium on Vehicle Dislays, pp. 1-5, Oct. 17, 2008.

Fukaya et al., "Improved Electgro-Holographic Display Using Liquid Crystal Devices to Diminish the System Size," Porceeds of International Conference on High Technology: Image Science and Technology, Evolution and Promise, World Techno Fair in Chiba, pp. 355-363, Sep. 11, 1996.

Difato et al., "Spatial Light Modulators for Complex Spatiotemporal Illumination of Neuronal Networks," Neuromethods, 67: 61-81 (2012).

Inoue, et al., "LCOS Spatial Light Modulator Controlled by 12-Bit Signals for Optical Phase-Only Modulation," Proceedings of SPIE, International Society for Optical Engineering, vol. 6487, pp. 64870Y-1 (2007).

Mias and Camon, "A Review of Active Optical Devices: II. Phase Modulation," Journal of Micromechanics and Microengineering, 18(8): 1-22 (Jun. 2008).

Ferri, "Visualization of 3D Information with Digital Holography Using Laser Printers," Computers & Graphics, 25:309-321(2001).

Notification of Transmittal of the International Search Report and the Written Opinion of the International Searching Authority, International Application No. PCT/GB2011/051328, dated Sep. 21, 2011.

* cited by examiner

2D/3D HOLOGRAPHIC DISPLAY SYSTEM

This application is a continuation of U.S. patent application Ser. No. 13/810,001 filed on Jun. 5, 2013, which is hereby incorporated herein by reference in its entirety. U.S. patent application Ser. No. 13/810,001 is a U.S. national phase application of International Patent Application no. PCT/GB2011/051328 filed on Jul. 14, 2010, which claims the benefit of United Kingdom Patent Application no. GB 1011829.7 filed on Jul. 14, 2010. The benefit of priority of the above-referenced applications is hereby claimed.

The present invention relates a display system and a method of displaying images. Embodiments relate to virtual image display systems and methods, and some embodiments relate to head-up display systems.

BACKGROUND

Light scattered from an object contains both amplitude and phase information. This amplitude and phase information can be captured on, for example, a photosensitive plate by well known interference techniques to form a hologram comprising interference fringes. The hologram may be reconstructed to form an image, or holographic reconstruction, representative of the original object by illuminating the hologram with suitable light.

Computer-generated holography may numerically simulate the interference process using Fourier techniques.

It has been proposed to use holographic techniques in a two-dimensional image projector.

Figure 1:
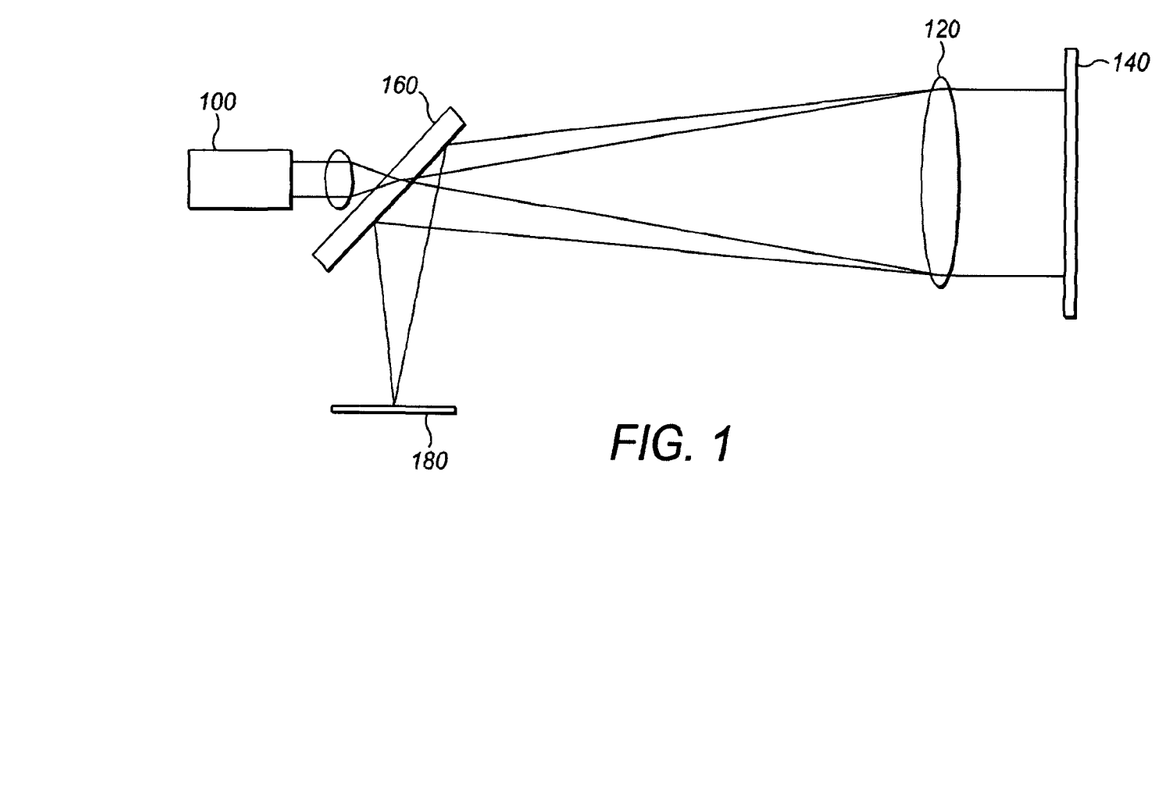
FIG. 1 shows the basic principle of a conventional holographic image display.

Referring to FIG. 1, there is shown a light source 100 which applies light via a Fourier lens (120) onto a spatial light modulator (140) in this case as a generally planar wavefront. The spatial light modulator is reflective and consists of an array of a large number of phase-modulating elements. Light is reflected by the spatial light modulator and consists of two parts, a first specularly reflected portion (known as the zero order) and a second portion that has been modulated by the phase-modulating elements to form a wavefront of spatially varying phase. Due to the reflection by the spatial light modulator all of the light is reflected generally back towards the light source (100) where it impinges on a mirror with aperture (160) disposed at 45° to the axis of the system. All of the image part of the light is reflected by the mirror towards a screen (180) that is generally parallel to the axis of the system. Due to the action of the Fourier lens (120), the light that impinges on the screen (180) forms a real image that is a reconstruction of an image from which the information applied to the phase modulating elements was derived.

Embodiments relate to an improved 2D real-time projector for forming virtual images of holographic reconstructions and providing adaptive positional control of the virtual image in space, and allow for spatial filtering of the reconstruction.

SUMMARY OF THE INVENTION

Aspects of the invention are defined in the appended independent claims.

In summary, a spatial light modulator (SLM) forms an array of phase-modulating elements that collectively represent a phase-only Fourier transform of a desired image which can be reconstructed by correctly illuminating the SLM, to form a projector. The phase-only distribution may be referred to as a hologram. The image may be described as the holographic reconstruction. The elements of the SLM may be referred to as pixels.

The holographic reconstruction is imaged by an optical viewing system to form a virtual image. The inventor has recognised that by providing variable lensing data to the hologram, the position of the virtual image relative to a viewer can be changed. This can provide a "depth" to the display system and allow virtual images to be presented at different distances from the viewer to provide a pseudo 3D system in real-time. In particular, the inventor has recognised that by forming an intermediate reconstruction, spatial filtering may be performed to remove higher diffracted orders produced by the hologram. This gives rise to an improved viewing system particular for real-time applications such as head-up displays.

BRIEF DESCRIPTION OF THE DRAWINGS

Embodiments of the present invention will now be described to the accompanying drawings in which:—

In the figures like reference numerals referred to like parts.

DETAILED DESCRIPTION OF THE DRAWINGS

It is found that the phase information alone is sufficient to generate a hologram which can give rise to a holographic reconstruction of acceptable quality. That is, the amplitude information in the hologram can be discarded. This can reduce the power of the required laser light sources but has other advantages too. Fourier-based computer generated holographic techniques have therefore been developed using only the phase information.

The image reconstructed by a hologram is given by the Fourier transform of the hologram. The hologram is therefore a phase-only pattern representative of the Fourier transform of the object whereas the reconstructed image (or holographic reconstruction) may contain both amplitude and phase information.

Gerchberg-Saxton is one example of an iterative algorithm for calculating a phase only hologram from input image data comprising only amplitude information. The algorithm starts from a random phase pattern and couples this with amplitude data to form complex data. A discrete Fourier transform is performed on the complex data and the resultant dataset is the Fourier components, which are made up of magnitude and phase. The magnitude information is set to a uniform value, and the phase is quantised, to match the phase values available. An inverse discrete Fourier transform is then performed. The result is another complex dataset, where the magnitude information is overwritten by the target image and the process is repeated. The Gerchberg-Saxton algorithm therefore iteratively applies spatial and spectral constraints while repeatedly transferring a data set (amplitude and phase), between the spatial domain and the Fourier (spectral) domain.

The Gerchberg-Saxton algorithm and derivatives thereof are often much faster than other "non-Fourier transform" algorithms such as direct binary search algorithms. Modified algorithms based on Gerchberg-Saxton have been developed—see, for example, co-pending published PCT application WO 2007/131650 incorporated herein by reference.

These improved techniques are able to calculate holograms at a sufficient speed that 2D video projection is realised. Embodiments described herein relate to 2D video projection using a computer-generated hologram calculated using such a modified Gerchberg-Saxton algorithm Holographically generated 2D video images are known to possess significant advantages over their conventionally projected counterparts, especially in terms of definition and efficiency. However, the computational and hardware complexity of the current hologram generation algorithms preclude their use in real-time applications. Recently these problems have been solved—see, for example, published PCT application WO 2005/059881 incorporated herein by reference.

To display the phase only holographic data, a phase modulating device is required. Since these devices do not modulate the amplitude, they are optically transparent, in general. Therefore no light is lost to absorption, for example. This has the major advantage that all of the reconstruction light is used in the creation of the holographic reconstruction. This translates to a more energy efficient display system.

The phase modulating device may be pixellated and each pixel will act as a diffractive element. The diffraction pattern from each pixel will give rise to a complex interference pattern at a screen referred to as a replay field. Due to this complex relationship, each pixel on the hologram contributes to multiple parts of the reconstructed image.

An example phase modulating device is a spatial light modulator (SLM). Typically a SLM has a field of addressable phase-modulating elements. In some SLMs the phase-modulating elements are a linear or one-dimensional array of elements; in others a two dimensional array are provided. For simplicity many SLMs have a regular 2-D array of like, generally square, phase-modulating elements; it is however not necessary for the phase-modulating elements to be alike in size or shape.

Figure 2:
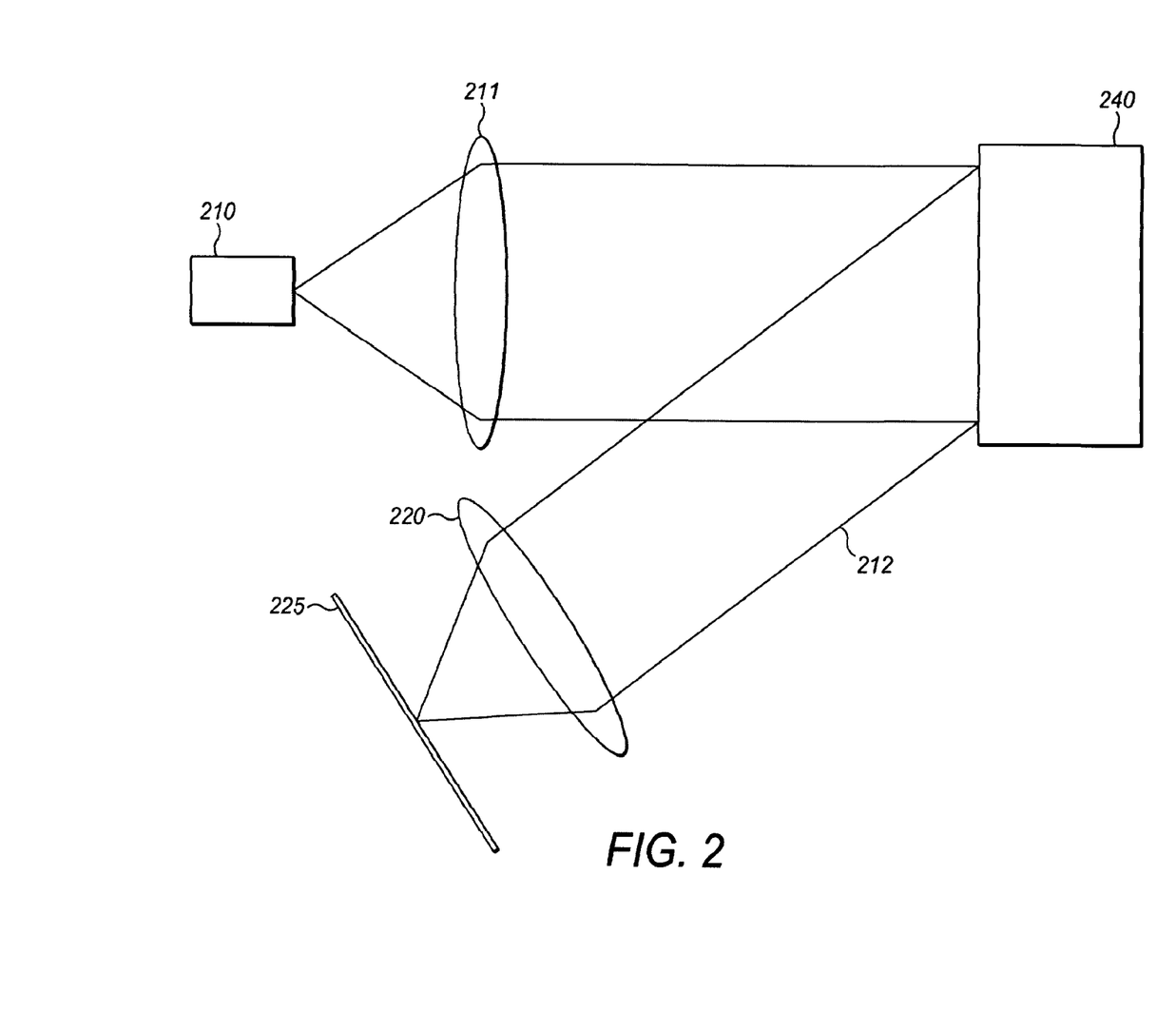
FIG. 2 shows a schematic drawing of an example of a reflective SLM.

FIG. 2 shows an example of using a reflective SLM, such as a LCOS, to produce a holographic reconstruction at a replay field location, in accordance with the present disclosure.

A light source (210), for example a laser or laser diode, is disposed to illuminate the SLM (240) via a collimating lens (211). The collimating lens causes a generally planar wavefront of light to become incident on the SLM. The direction of the wavefront is slightly off-normal (i.e. two or three degrees away from being truly orthogonal to the plane of the transparent layer). The arrangement is such that light from the light source is reflected off a mirrored rear surface of the SLM and interacts with a phase-modulating layer to form an exiting wavefront (212). The exiting wavefront (212) is applied to optics including a Fourier transform lens (220), having its focus at a screen (225).

The Fourier transform lens receives light from the SLM and performs a frequency-space transformation to produce a holographic reconstruction at the screen (225) in the spatial domain.

In this process, the light from the light source is generally evenly distributed across the SLM (240), and across the phase modulating layer. Light exiting the phase-modulating layer may be distributed across the screen. There is no correspondence between a specific image region of the screen and any one phase-modulating element.

Figure 3:
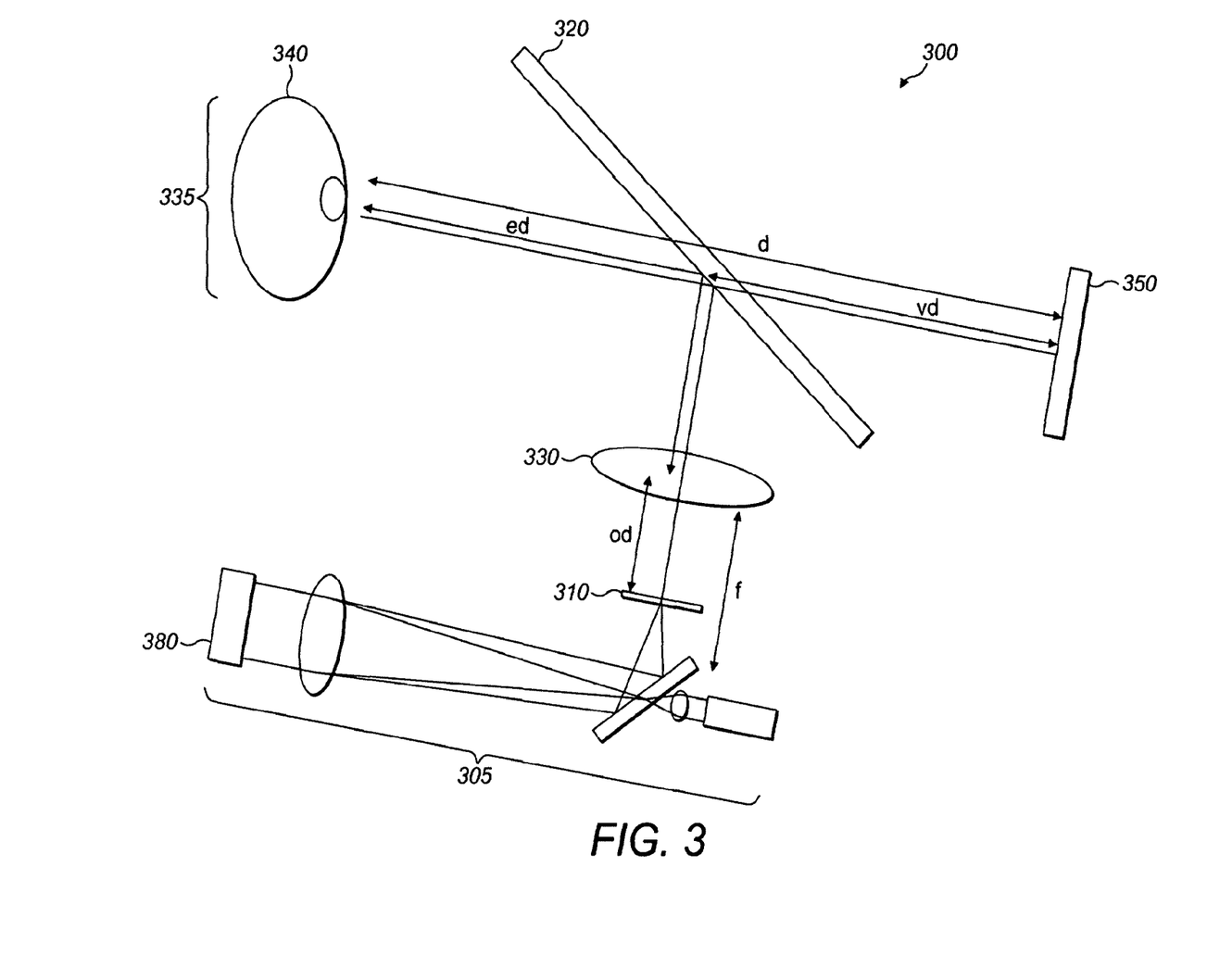
FIG. 3 shows a schematic drawing of a display.

Referring to FIG. 3, there is shown an embodiment in accordance with the present disclosure using the SLM based system described above. FIG. 3 shows a head-up display (300) having an SLM based system (305) for providing a real image of a holographic reconstruction (310). The holographic reconstruction is formed at a so-called replay field. The spatial position of the replay field may be varied in accordance with embodiments described herein.

The display consists of an optical combiner (320) and a lens (330) disposed between the holographic reconstruction (310) and the combiner (320). The arrangement is such that a viewer (340) looking towards the combiner (320) will see a virtual image (350) of the holographic reconstruction (310) at a distance d from the viewer and behind the combiner (320). Such a system can be used for example in a head-up display or head-mounted display.

The optical system (335) may consist of a lens having a focal length f, and located at distance ed from the viewer. The holographic reconstruction (310) is at a real distance od behind the lens. If the holographic reconstruction (310) is disposed in the focal plane of the lens (330) then the viewer (340) will perceive the image (350) to be at infinity.

However if the holographic reconstruction (310) is closer to the lens (330) then the focal length of the lens (330) the image (350) will no longer be at infinity.

Provided the holographic reconstruction is closer to the lens (330) than the focal length of the lens then the image (350) can be arranged to appear closer than at infinity, and appear at a virtual distance vd. The calculations are as follows:—

$$od = \frac{1}{\left(\frac{1}{f} - \frac{1}{-vd}\right)}$$

The above-mentioned replay field location may be varied by varying the lensing characteristic of phase only lensing data applied to the spatial light modulator (380). Thus for a first lensing characteristic the position of the real image (310) can be relatively close to the lens (330) and for a second value of lensing data the real image 310 is relatively more distant from the lens (330). This means that the image (350) created by the virtual image display can be varied in apparent depth.

In summary the information that is applied to the phase modulating elements of the SLM (380) consists of two parts, a first part that comprises the information representative of the final image and a second part which has the effect of providing a negative lensing and adjustment characteristic. By varying this latter part it is possible to cause the position of the holographic reconstruction and therefore virtual image (350) to be varied.

By using a sufficiently fast spatial light modulator, an appropriate computational algorithm and by writing data appropriately to the spatial light modulator it is possible to image different sub-frames of data at different apparent depths. The SLM must be sufficiently fast to allow information to be electrically written and optically read-out multiple times in a standard video frame. If the sub-frames are displayed sufficiently quickly, they may appear to a human viewer to be present simultaneously.

Figure 4:
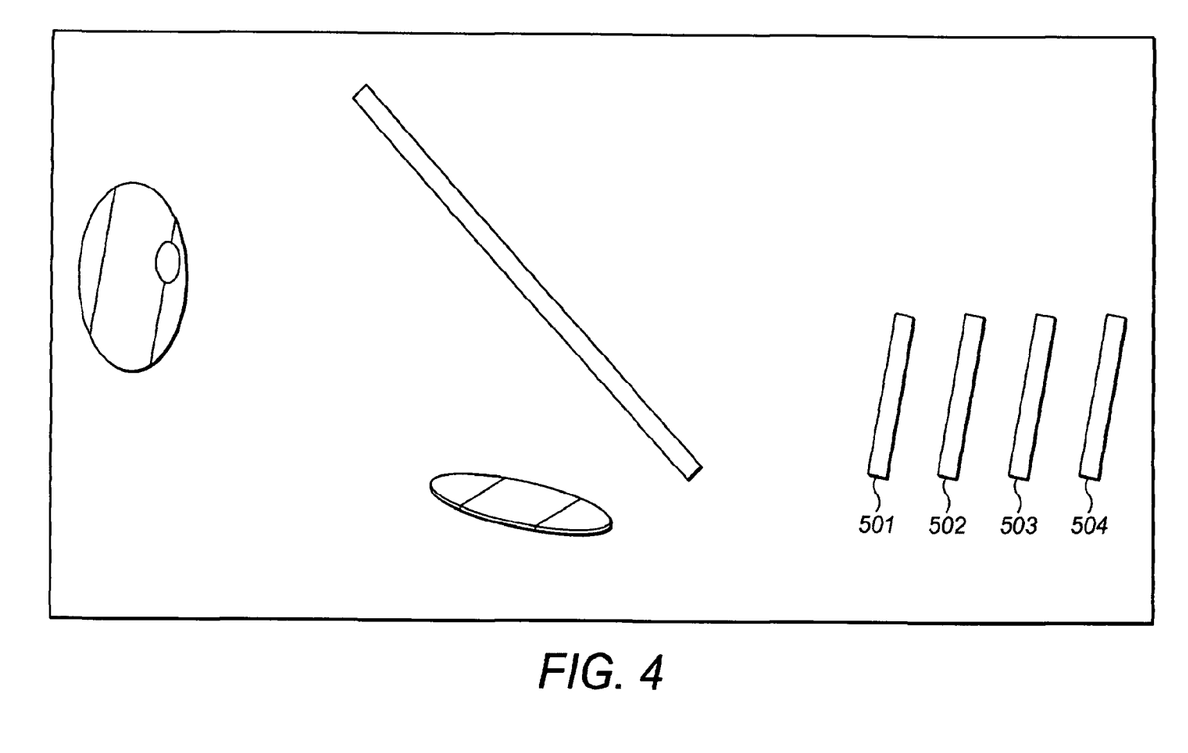
FIG. 4 shows the effect of varying lensing information at the position of the virtual image.

For example a general image can appear to be 2.5 metres from the viewer (340) but a part of the image—for example an image of especial importance to the viewer—can, by providing its imaging data in a different sub-frame and by changing the lensing data for that sub-frame—cause that image to appear in front of the general image plane. This is shown schematically in FIG. 4 which shows four different subframe image positions, denoted 501, 502, 503 and 504.

The arrangement of FIG. 3 should be distinguished from configurations in which the viewer is positioned at the real image (310). Such configurations may be referred to as "direct view". In such cases, the viewer's eyes as the Fourier lens.

In summary the present disclosure relates to a virtual image display in which a holographic reconstruction (310) is first formed as a real image in space. The real image (310) forms the "object" for lens (330) which produces a virtual image (350) of the real image (310). The virtual image (350) may be seen by the viewer by looking through the optical combiner (320) as shown in FIG. 3.

By modifying the lensing data applied to the spatial light modulator (380), the position of the real image (310) can be changed. Accordingly, the position of the virtual image (350) can also be changed.

In contrast, when the viewer is position at the real image (310) the viewer functions as the Fourier lens and so sees all diffracted orders of the reconstruction field. That is, the viewer would see multiple replicas of the primary reconstruction—in order words, multiple reconstructions. The presence of multiple orders may lead to confusion particularly in a head-up display, for example.

Additionally the quality of the reconstructed hologram is also affect by the so-called zero order problem which is a consequence of the diffractive nature of the reconstruction.

Such zero-order light can be regarded as "noise" and includes for example specularly reflected light, and other light that is unrefracted by the patterns on the spatial light modulator.

This "noise" is generally focussed at the focal point of the Fourier lens, leading to a bright spot at the centre of a reconstructed hologram. In a direct view application the zero order would be a substantial distraction when looking at the virtual image.

Advantageously, by imaging the intermediate reconstruction it is possible to filter out the zero order and the higher diffracted orders of the reconstruction field at the intermediate reconstruction. This may be achieve, for example, by positioning a spatial filter at the real image (310) to provide a physical aperture through which only preferred orders such as the primary order can pass.

Conventionally, the zero order light is simply blocked out however this would clearly mean replacing the bright spot with a dark spot.

However as the hologram contains three dimensional information, it is possible to displace the reconstruction into a different plane in space—see, for example, published PCT application WO 2007/131649 incorporated herein by reference.

The application of the present invention includes head up displays and head mounted displays, inter alia. The invention allows for full colour holograms with different information at different distances or depths from the viewer, full 3D with a very limited volume by stacking multiple subframes, a large number of different images at different distances, perspective tracking of objects and enhance reality, for example a near-eye augmented-reality system with the ability to overlay different information at different depths.

In embodiments, the spatial light modulator is a Liquid Crystal over silicon (LCOS) device. The image quality is, of course, affected by the number of pixels and the number of possible phase levels per pixel.

LCOS devices are a hybrid of traditional transmissive liquid crystal display devices, where the front substrate is glass coated with Indium Tin Oxide to act as a common electrical conductor. The lower substrate is created using a silicon semiconductor process with an additional final aluminium evaporative process being used to create a mirrored surface, these mirrors then act as the pixel counter electrode.

Compared with conventional glass substrates these devices have the advantage that the signal lines, gate lines and transistors are below the mirrored surface, which results in much higher fill factors (typically greater than 90%) and higher resolutions.

LCOS devices are now available with pixels between 4.5 μm and 12 μm, this size is determined by the mode of operation and therefore amount of circuitry that is required at each pixel.

Figure 5:
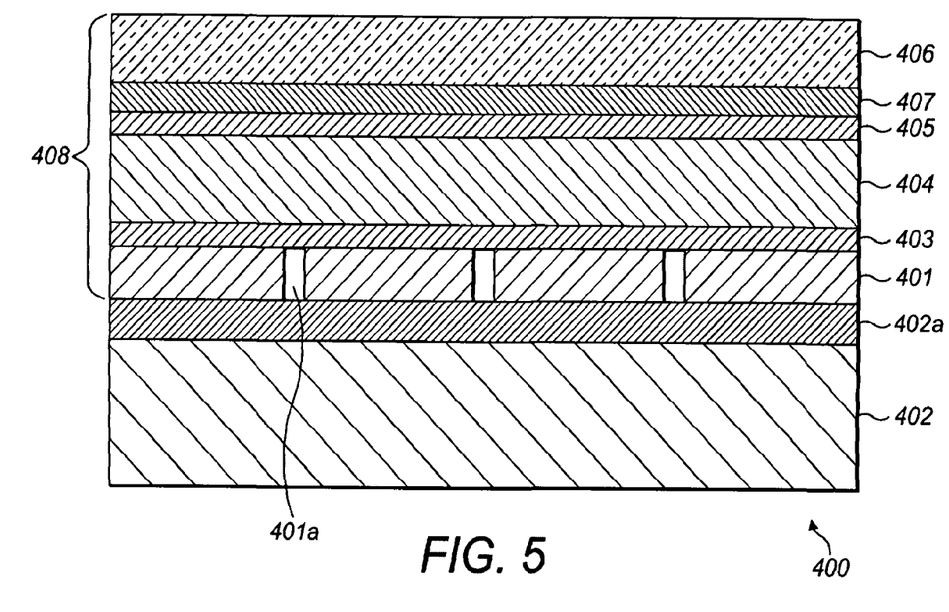
FIG. 5 shows a schematic drawing of a LCOS SLM device.

The structure of an LCOS device is shown in FIG. 5.

A LCOS device is formed using a single crystal silicon substrate (402). It has a 2D array of square planar aluminium electrodes (401), spaced apart by a gap (401a), arranged on the upper surface of the substrate. Each of the electrodes (401) can be addressed via circuitry (402a) buried in the substrate (402). Each of the electrodes forms a respective planar mirror. An alignment layer (403) is disposed on the array of electrodes, and a liquid crystal layer (404) is disposed on the alignment layer (403). A second alignment layer (405) is disposed on the liquid crystal layer (404) and a planar transparent layer (406), e.g. of glass, is disposed on the second alignment layer (405). A single transparent electrode (407) e.g. of ITO is disposed between the transparent layer (406) and the second alignment layer (405).

Each of the square electrodes (401) defines, together with the overlying region of the transparent electrode (407) and the intervening liquid crystal material, a controllable phase-modulating element (408), often referred to as a pixel. The effective pixel area, or fill factor, is the percentage of the total pixel which is optically active, taking into account the space between pixels (401a). By control of the voltage applied to each electrode (401) with respect to the transparent electrode (407), the properties of the liquid crystal material of the respective phase modulating element may be varied, thereby to provide a variable delay to light incident thereon. The effect is to provide phase-only modulation to the wavefront, i.e. no amplitude effect occurs.

A major advantage of using a reflective LCOS spatial light modulator is that the liquid crystal layer is half the thickness that it would be if a transmissive device were used. This greatly improves the switching speed of the liquid crystal (a key point for projection of moving video images). A LCOS device is also uniquely capable of displaying large arrays of phase only elements in a small aperture. Small elements (typically approximately 10 microns) result in a practical diffraction angle (a few degrees) so that the optical system does not require a very long optical path.

It is easier to adequately illuminate the small aperture (a few square centimetres) of a LCOS SLM than it would be for the aperture of a larger liquid crystal device. LCOS SLMs also have a large aperture ratio, there is very little dead space between the pixels (as the circuitry to drive them is buried under the mirrors). This is an important issue to lowering the optical noise in the replay field.

The above device typically operates within a temperature range of 10° C. to around 50° C., with the optimum device operating temperature being around 40° C. to 50° C.

As a LCOS device has the control electronics embedded in the silicon backplane, the Fill factor of the pixels is higher, leading to less unscattered light leaving the device.

Using a silicon backplane has the advantage that the pixels are optically flat, which is important for a phase modulating device.

A colour 2D holographic reconstruction can be produced and there are two main methods of achieving this. One of these methods is known as "frame-sequential colour" (FSC). In an FSC system, three lasers are used (red, green and blue) and each laser is fired in succession at the SLM to produce each frame of the video. The colours are cycled (red, green, blue, red, green, blue, etc.) at a fast enough rate such that a human viewer sees a polychromatic image from a combination of the three lasers. Each hologram is therefore colour specific. For example, in a video at 25 frames per second, the first frame would be produced by firing the red laser for $1/75^{th}$ of a second, then the green laser would be fired for $1/75^{th}$ of a second, and finally the blue laser would be fired for $1/75^{th}$ of a second. The next frame would then be produced, starting with the red laser, and so on.

An alternative method, that will be referred to as "spatially separated colours" (SSC) involves all three lasers being fired at the same time, but taking different optical paths, e.g. each using a different SLM, and then combining to form the colour image.

An advantage of the frame-sequential colour (FSC) method is that the whole SLM is used for each colour. This means that the quality of the three colour images produced will not be compromised because all pixels on the SLM are used for each of the colour images. However, a disadvantage of the FSC method is that the overall image produced will not be as bright as a corresponding image produced by the SSC method by a factor of about 3, because each laser is only used for a third of the time. This drawback could potentially be addressed by overdriving the lasers, or by using more powerful lasers, but this would require more power to be used, would involve higher costs and would make the system less compact.

An advantage of the SSC (spatially separated colours) method is that the image is brighter due to all three lasers being fired at the same time. However, if due to space limitations it is required to use only one SLM, the surface area of the SLM can be divided into three equal parts, acting in effect as three separate SLMs. The drawback of this is that the quality of each single-colour image is decreased, due to the decrease of SLM surface area available for each monochromatic image. The quality of the polychromatic image is therefore decreased accordingly. The decrease of SLM surface area available means that fewer pixels on the SLM can be used, thus reducing the quality of the image. The quality of the image is reduced because its resolution is reduced.

Embodiments implement the technique of "tiling", in which the surface area of the SLM is further divided up into a number of tiles, each of which is set in a phase distribution similar or identical to that of the original tile. Each tile is therefore of a smaller surface area than if the whole allocated area of the SLM were used as one large phase pattern. The smaller the number of frequency component in the tile, the further apart the reconstructed pixels are separated when the image is produced. The image is created within the zeroth diffraction order, and it is preferred that the first and subsequent orders are displaced far enough so as not to overlap with the image and may be blocked by way of a spatial filter.

As mentioned above, the image produced by this method (whether with tiling or without) comprises spots that form image pixels. The higher the number of tiles used, the smaller these spots become. If one takes the example of a Fourier transform of an infinite sine wave, a single frequency is produced. This is the optimum output. In practice, if just one tile is used, this corresponds to an input of a single phase of a sine wave, with a zero values extending in the positive and negative directions from the end nodes of the sine wave to infinity. Instead of a single frequency being produced from its Fourier transform, the principle frequency component is produced with a series of adjacent frequency components on either side of it. The use of tiling reduces the magnitude of these adjacent frequency components and as a direct result of this, less interference (constructive or destructive) occurs between adjacent image pixels, thereby improving the image quality.

Preferably, each tile is a whole tile, although it is possible to use fractions of a tile.

There is provided a method of displaying images comprising varying lensing data on a spatial light modulator while varying imaging data applied to the spatial light modulator, whereby images of objects may be formed at different depths with regard to an image plane.

This image plane may be used in a virtual imaging system.

The step of varying data may be carried out in such a way that the plural images formed at different depths appear to the human eye to be simultaneously present. There is provided a method of displaying, the method comprising applying data for forming an image to a SLM, illuminating the SLM, applying the resultant light to an optical system for forming a virtual image, wherein the data applied to the SLM includes first data and second data, the first data related to the content of the image and the second data determined to provide at least a lensing function by the SLM, the method further comprising varying the second data in such a way that plural images formed at different depths appear to the human eye to be simultaneously present.

The method may comprise varying the first data whereby the plural images differ from one another.

There is provided a display comprising an SLM, circuitry for operating the SLM, an illumination device for illuminating the SLM and an optical system adapted to form a virtual image reconstructed from data on the SLM, wherein the circuitry is adapted to apply data for forming an image to the SLM, the data applied including first data and second data, the first data related to the content of the image and the second data determined to provide a lensing function by the SLM, and the circuitry adapted to vary the second data in such a way that plural images formed at different depths appear to the human eye to be simultaneously present.

The optical system may comprise a Fourier lens

The display may form a head-up display.

The invention is not restricted to the described embodiments but extends to the full scope of the appended claims.

The invention claimed is:

1. A method for displaying a virtual image to a viewer, the method comprising:
displaying first holographic-domain data representative of a first two-dimensional (2D) image and first holographic-domain lensing data representative of a first optical power on a phase-modulating spatial light modulator;
producing, as a real image in space spatially remote from the viewer, a first 2D holographic reconstruction image, by modulating light from a light source with the spatial light modulator and performing a holographic transform on the light; and displaying a first virtual image of the first 2D holographic reconstruction image using an optical viewing system.

2. The method of claim 1, wherein producing the first 2D holographic reconstruction image includes illuminating the spatial light modulator with the light to produce first spatially modulated light, then performing a holographic transform of the first modulated light.

3. The method of claim 2, further comprising, after performing the holographic transform, spatially filtering the light to selectively block at least one diffraction order of the first 2D holographic reconstruction image.

4. The method of claim 1, further comprising:

after displaying the first holographic-domain data representative of the first two-dimensional image and the first holographic-domain lensing data on the phase-modulating spatial light modulator, displaying second holographic-domain data representative of a second two-dimensional image and second holographic-domain lensing data representative of a second optical power different to the first optical power on the phase-modulating spatial light modulator;

producing, as a real image in space spatially remote from the viewer, a second 2D holographic reconstruction image of the second 2D image, by modulating the light with the spatial light modulator and performing a holographic transform on the light; and displaying a second virtual image of the second 2D holographic reconstruction image using the optical viewing system, wherein the first and second virtual images are spatially displaced relative to each other to form replay fields at different distances from a viewer.

5. The method of claim 4, wherein producing the second 2D holographic reconstruction image includes illuminating the spatial light modulator with the light to produce second spatially modulated light, then performing a holographic transform of the second modulated light.

6. The method of claim 5, further comprising, after performing the holographic transform, spatially filtering the light to selectively block at least one diffraction order of the first 2D holographic reconstruction image.

7. The method of claim 1, wherein the optical viewing system comprises an imaging lens having a focal length, the lens being disposed at a distance less than the focal length from the position of the real image in space, and wherein the displaying the first virtual image of the first 2D holographic reconstruction image comprises imaging the real image with the imaging lens.

8. The method of claim 1, wherein the first virtual image of the first 2D holographic reconstruction image is displayed on a heads-up display.

9. The method of claim 1, wherein the replay fields are spatially remote from the viewer.

10. The method of claim 1, further comprising selectively blocking at least one diffraction order of the first 2D holographic reconstruction image.

11. The method of claim 1, further comprising selectively blocking a zeroth undiffracted order of the first 2D holographic reconstruction image.

12. The method of claim 1, wherein the spatial light modulator comprises an array of pixelated diffractive elements.

13. The method of claim 12, wherein the spatial light modulator is a phase-only spatial light modulator.

14. The method of claim 1, wherein the first lensing data is representative of a negative optical power.

15. A display system for displaying a virtual image of a first two-dimensional (2D) image to a viewer, the display system comprising a holography system configured to produce a first 2D holographic reconstruction image of the first 2D image, the holography system comprising:

a processing system configured to provide first holographic-domain data representative of the first 2D image and to provide first holographic-domain lensing data representative of a first optical power;

a phase-modulating spatial light modulator configured to receive and display the first holographic-domain data representative of the first 2D image and the holographic-domain lensing data;

a light source configured to illuminate the spatial light modulator, the holography system being configured to modulate the light with the spatial light modulator and to perform a holographic transform on the light to produce the first 2D holographic reconstruction image; and an optical viewing system configured to display a first virtual image of the first 2D holographic reconstruction image to the viewer.

16. The display system of claim 15, wherein the light source is configured to illuminate the spatial light modulator to produce a first spatially modulated light, and wherein the holography system further includes a holographic transform lens configured to perform a holographic transform of the first modulated light.

17. The display system of claim 15, wherein the optical viewing system further comprises a spatial filter configured to selectively block at least one diffraction order of the first 2D holographic reconstruction image.

18. The display system of claim 15, wherein the optical viewing system comprises an imaging lens having a focal length, the lens being disposed at a distance less than the focal length from the position of the real image in space, and wherein the imaging lens is configured to image the real image to form the virtual image.

19. The display system of claim 15, wherein the first phase only lens has a negative optical power.

20. The display system of claim 15, wherein the spatial light modulator is a phase-only spatial light modulator.

21. The display system of claim 15, wherein the processing system is further configured to provide second holographic-domain data representative of a second 2D image and to provide second holographic-domain lensing data representative of a second optical power different to the first optical power;

the phase-modulating spatial light modulator is further configured to, after receiving and displaying the first holographic-domain data representative of the first 2D image and the first holographic-domain lensing data, receive and display the second holographic-domain data representative of the second 2D image and the second holographic-domain lensing data; and the optical viewing system is further configured to, after displaying the first virtual image of the first 2D holographic reconstruction, display a second virtual image of the second 2D holographic reconstruction image to the viewer, the first virtual image and the second virtual image being displayed at different virtual distances from the viewer.

22. The display system of claim 21, wherein the first and second virtual images are sequential frames of a 2D video stream, but appear to a viewer to be simultaneously present.

23. The display system of claim 15, wherein the first holographic-domain data representative of the first 2D image is Fourier-domain data representative of the first 2D image; the first holographic-domain lensing data representative of the first optical power is Fourier-domain lensing data representative of the first optical power; and the holographic transform is a Fourier transform.

24. The display system of claim 15, wherein the system is configured to perform the holographic transform on the light using the first holographic-domain lensing data displayed on the phase-modulating spatial light modulator.

25. The display system of claim 15, configured as a head-up display.

26. The method according to claim 1, wherein the first holographic-domain data representative of the first 2D image is Fourier-domain data representative of the first 2D image; the first holographic-domain lensing data representative of the first optical power is Fourier-domain lensing data representative of the first optical power; and the holographic transform is a Fourier transform.

27. The method system of claim 1, wherein the holographic transform is performed by the first holographic-domain lensing data displayed on the phase-modulating spatial light modulator.

* * * * *